US012790425B2

(12) United States Patent
Morita

(10) Patent No.: US 12,790,425 B2
(45) Date of Patent: Nov. 10, 2026

(54) RESIN COMPOSITION, ADHESIVE MEMBER, AND DISPLAY DEVICE INCLUDING THE SAME

(71) Applicant: Samsung Display Co., LTD., Yongin-si (KR)

(72) Inventor: Keisuke Morita, Yokohama (JP)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 19/057,622

(22) Filed: Feb. 19, 2025

(65) Prior Publication Data

US 2025/0188212 A1 Jun. 12, 2025

Related U.S. Application Data

(62) Division of application No. 17/124,409, filed on Dec. 16, 2020, now Pat. No. 12,252,569.

(30) Foreign Application Priority Data

Jan. 14, 2020 (KR) ........................ 10-2020-0005026

(51) Int. Cl.
*C08F 220/34* (2006.01)
*C08F 2/50* (2006.01)
(Continued)

(52) U.S. Cl.
CPC ............ *C08F 220/343* (2020.02); *C08F 2/50* (2013.01); *C08F 220/14* (2013.01); *C08F 220/1804* (2020.02); *C08F 220/1808* (2020.02); *C08F 220/1811* (2020.02); *C08F 220/20* (2013.01); *C08F 224/00* (2013.01); *C08F 226/06* (2013.01); *C08F 290/067* (2013.01); *C09J 4/00* (2013.01); *C09J 2203/318* (2013.01); *C09J 2203/326* (2013.01); *C09J 2433/00* (2013.01)

(58) Field of Classification Search
CPC .... C08F 2/50; C08F 220/14; C08F 220/1804; C08F 220/1808; C08F 220/1811; C08F 220/20; C08F 220/343; C08F 224/00; C08F 226/06; C08F 290/067; C09J 4/00; C09J 2203/318; C09J 2203/326; C09J 2433/00
See application file for complete search history.

(56) References Cited

U.S. PATENT DOCUMENTS

| | | | |
|---|---|---|---|
| 5,955,512 | A | 9/1999 | Numazawa et al. |
| 10,719,158 | B2 | 7/2020 | Park et al. |

(Continued)

FOREIGN PATENT DOCUMENTS

| | | |
|---|---|---|
| CN | 103509516 | 1/2014 |
| CN | 106960849 | 7/2017 |

(Continued)

OTHER PUBLICATIONS

English-language machine translation of JP 6438165 B1 (Year: 2018).*

*Primary Examiner* — James C Goloboy
(74) *Attorney, Agent, or Firm* — CANTOR COLBURN LLP

(57) ABSTRACT

A resin composition for a display device includes: a (meth) acrylic monomer having at least one (meth)acryloyl group; a urethane acrylate oligomer having a weight average molecular weight of about 27,000 to about 50,000; and at least one photoinitiator.

6 Claims, 11 Drawing Sheets

(51) Int. Cl.

| | |
|---|---|
| ***C08F 220/14*** | (2006.01) |
| ***C08F 220/18*** | (2006.01) |
| ***C08F 220/20*** | (2006.01) |
| ***C08F 224/00*** | (2006.01) |
| ***C08F 226/06*** | (2006.01) |
| ***C08F 290/06*** | (2006.01) |
| ***C09J 4/00*** | (2006.01) |

(56) References Cited

U.S. PATENT DOCUMENTS

| | | | | |
|---|---|---|---|---|
| 2012/0177912 | A1* | 7/2012 | Kim | C09J 175/16 428/332 |
| 2014/0099495 | A1 | 4/2014 | Kim et al. | |
| 2017/0043566 | A1 | 2/2017 | Kanno et al. | |
| 2017/0153668 | A1 | 6/2017 | Jang et al. | |
| 2017/0200915 | A1 | 7/2017 | Lee et al. | |
| 2021/0130632 | A1* | 5/2021 | Yamamoto | C09D 11/38 |

FOREIGN PATENT DOCUMENTS

| | | | |
|---|---|---|---|
| JP | 61021118 | A | 1/1986 |
| JP | 2008024862 | | 2/2008 |
| JP | 2014189572 | | 10/2014 |
| JP | 2017210578 | | 11/2017 |
| JP | 6329102 | | 5/2018 |
| JP | 2018117002 | | 7/2018 |
| JP | 6438165 | B1 * | 12/2018 |
| JP | 2019044152 | A | 3/2019 |
| JP | 2019108498 | | 7/2019 |
| JP | 2019108499 | | 7/2019 |
| JP | 2019108500 | | 7/2019 |
| JP | 2019108501 | | 7/2019 |
| JP | 2019108502 | | 7/2019 |
| JP | 6570117 | | 9/2019 |
| KR | 20120081769 | A | 7/2012 |
| KR | 1020120138482 | A | 12/2012 |
| KR | 20130035354 | A | 4/2013 |
| KR | 1020170084402 | A | 7/2017 |
| KR | 101771776 | | 8/2017 |
| KR | 20190013760 | | 2/2019 |
| KR | 20200001640 | A | 1/2020 |
| WO | 2017203783 | | 11/2017 |

* cited by examiner

RESIN COMPOSITION, ADHESIVE MEMBER, AND DISPLAY DEVICE INCLUDING THE SAME

CROSS-REFERENCE TO RELATED APPLICATION

This U.S. non-provisional patent application is a divisional of U.S. patent application Ser. No. 17/124,409, filed on Dec. 16, 2020, which claims priority under 35 U.S.C. § 119 of Korean Patent Application No. 10-2020-0005026, filed on Jan. 14, 2020, the entire contents of which are hereby incorporated by reference.

BACKGROUND

Field

Exemplary implementations of the invention relate generally to a resin composition and, more specifically, to a display device including an adhesive member made from the resin composition.

Discussion of the Background

Various display devices such as televisions, mobile phones, tablet computers, navigation devices, and game consoles used in multimedia devices are being developed. In particular, recently, in order to facilitate portability and improve user convenience, a display device including a flexible display member that can be folded, bent, or rolled is being developed.

In the case of such a flexible display device, each member used therein must be secured reliably in a folding or bending operation. In addition, an adhesive resin used to form adhesive layers applied to various types of display devices needs to have excellent coating properties on members used in various types of display devices.

The above information disclosed in this Background section is only for understanding of the background of the inventive concepts, and, therefore, it may contain information that does not constitute prior art.

SUMMARY

Resin compositions and adhesive members made therefrom according to the principles and exemplary implementations of the invention have excellent applicability, a low modulus of elasticity, and high adhesion characteristics after curing.

Display devices having adhesive members made according to the principles and exemplary implementations of the invention have excellent operational reliability when folding due to the low modulus of elasticity and high adhesive strength characteristics of the adhesive member.

Additional features of the inventive concepts will be set forth in the description which follows, and in part will be apparent from the description, or may be learned by practice of the inventive concepts.

According to one aspect of the invention, a resin composition for a display device includes: a (meth)acrylic monomer having at least one (meth)acryloyl group; a urethane acrylate oligomer having a weight average molecular weight of about 27,000 to about 50,000; and at least one photoinitiator.

In an exemplary embodiment, the resin composition may have a viscosity of about 10 mPa·s to about 50 mPa·s at 25° C. as measured by JIS K7117-2 method.

The urethane acrylate oligomer may include a photocurable compound having at least one (meth)acryloyl group having a urethane bond.

The urethane acrylate oligomer may be included by about 10 wt % to about 30 wt % based on a total content of 100 wt % of the (meth)acrylic monomer and the urethane acrylate oligomer.

The (meth)acrylic monomer may include 2-ethylhexyl acrylate, (2-methyl-2-ethyl-1,3-dioxolan-4-yl)methyl acrylate, 4-hydroxybutyl acrylate, and 4-acryloyl morpholine.

The resin composition may have a storage elastic modulus of about $1.0\times10^3$ Pa to about $1.0\times10^6$ Pa at 25° C. after UV curing.

The resin composition may have a 180° peeling strength of about 15 N/inch or more after UV curing, and the 180° peeling strength may be a peeling strength with respect to a glass substrate.

According to another aspect of the invention, an adhesive member for a display device includes a polymer made from a resin composition that includes: a (meth)acrylic monomer having at least one (meth)acryloyl group; a urethane acrylate oligomer having a weight average molecular weight of about 27,000 to about 50,000; and at least one photoinitiator.

The resin composition may have a viscosity of about 10 mPa·s to about 50 mPa·s at about 25° C. as measured by JIS K7117-2 method.

The adhesive member may have a storage elastic modulus of about $1.0\times10^3$ Pa to about $1.0\times10^6$ Pa at 25° C.

The adhesive member may have a 180° peeling strength of about 15 N/inch or more, with respect to a glass substrate.

According to a further aspect of the invention, a display device includes: a display module including a display panel; a window disposed on the display panel; and an adhesive disposed between the display panel and the window, wherein the adhesive includes a polymer made from a resin composition, the resin composition having a (meth)acrylic monomer including at least one (meth)acryloyl group, a urethane acrylate oligomer having a weight average molecular weight of about 27,000 to about 50,000, and at least one photoinitiator.

The adhesive may include an adhesive member having a thickness of about 50 μm to about 200 μm.

An input sensor may be disposed on the display panel, wherein the adhesive may be disposed between the display panel and the input sensor or between the input sensor and the window.

The display panel may include a display element layer and an encapsulation layer may be disposed on the display element layer, the input sensor having an input sensing unit directly disposed on the encapsulation layer, and the adhesive may be disposed on the input sensing unit.

The (meth)acrylic monomer may include at least one of 2-ethylhexyl acrylate, (2-methyl-2-ethyl-1,3-dioxolan-4-yl) methyl acrylate, 4-hydroxybutyl acrylate, 4-acryloyl morpholine, isobornyl acrylate, n-butyl acrylate, butyl-methacrylate, methyl (meth)acrylate, 2-hydroxyethyl acrylate, and octyl (meth)acrylate.

The adhesive may directly provide the resin composition on one surface of the window or one surface of the display module, and may be formed by UV curing the provided resin composition.

At least one foldable area may have a radius of curvature of about 5 mm or less.

A light control layer may be disposed between the adhesive and the window and an optical adhesive layer may be disposed between the light control layer and the window, wherein the optical adhesive layer may include a polymer made from the resin composition.

The light control layer may be a polarization plate or a color filter layer.

The optical adhesive layer may have a storage elastic modulus of about $1.0\times10^3$ Pa to about $1.0\times10^6$ Pa at 25° C., and a 180° peeling strength of about 15 N/inch with respect to a glass substrate.

An input sensor may be disposed between the adhesive and the light control layer and an interlayer adhesive layer may be disposed between the input sensor and the light control layer.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
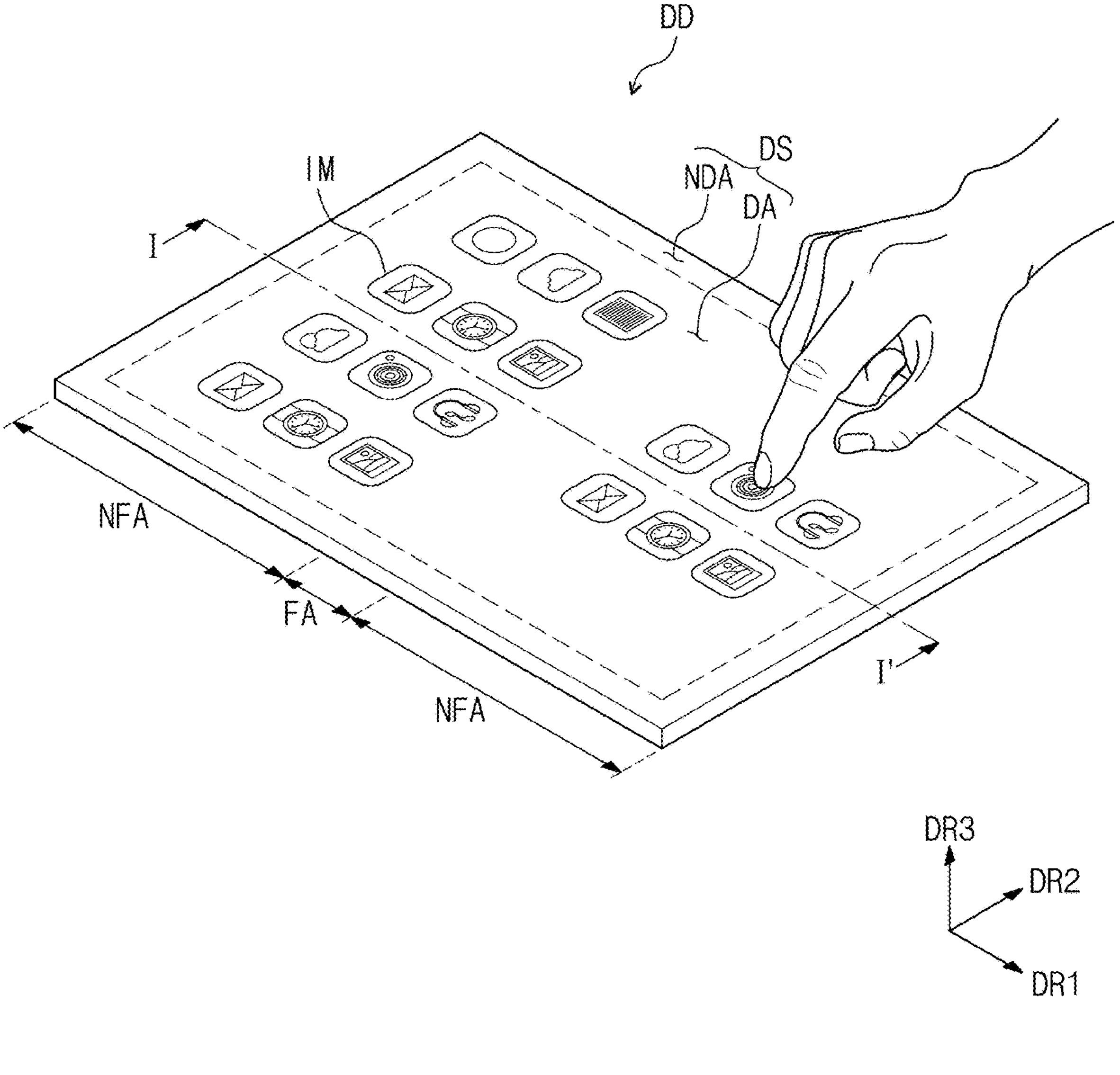
FIG. 1 is a perspective view illustrating an exemplary embodiment of a display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, a region, film, plate, or a section, is referred to as being "on," "connected to," or "coupled to" another element, layer, region, film, plate, or section, it may be directly on, connected to, or coupled to the other element, layer, region, film, plate, or section or intervening elements, layers, regions, films, plates, or sections may be present. When, however, an element, layer, region, film, plate, or section is referred to as being "directly on," "directly connected to," or "directly coupled to" another element, layer, region, film, plate, or section, there are no intervening elements, layers, regions, films, plates, or sections present. As a further example, being "directly disposed on" may mean being disposed between two layers or two members without using an additional member, such as an adhesive member. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," "including," "has," "have," and/or "having," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
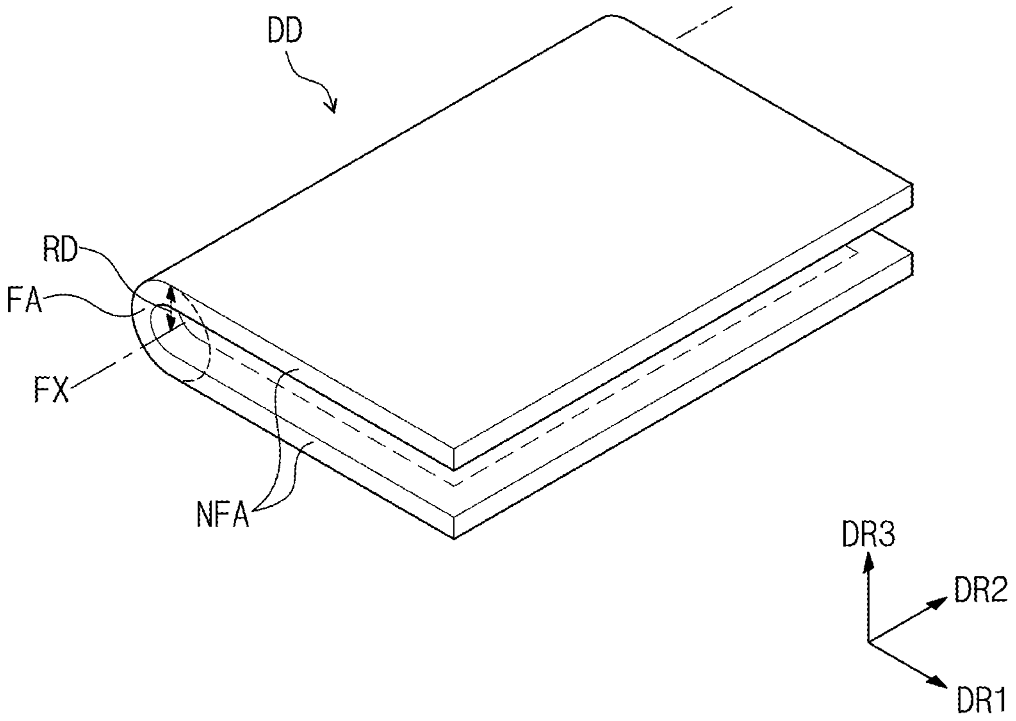
FIG. 2 is a perspective view illustrating the display device shown in FIG. 1 in a folded position.

FIG. 1 is a perspective view illustrating an exemplary embodiment of a display device constructed according to principles of the invention. FIG. 2 is a perspective view illustrating the display device shown in FIG. 1 in a folded position.

Referring to FIG. 1, a display device DD of an exemplary embodiment may have a generally rectangular shape having long sides extending in the direction of a first directional axis DR1 and short sides extending in the direction of a second directional axis DR2 intersecting the first directional axis DR1. However, the exemplary embodiments are not limited thereto, and the display device DD may have various shapes such as a generally circular shape or a generally polygonal shape in a plan view. The display device DD may be a flexible display device.

In the display device DD according to an exemplary embodiment, a display surface DS on which an image IM is displayed may be generally parallel to a plane defined by the first directional axis DR1 and the second directional axis DR2. A normal direction of the display surface DS, that is, the thickness direction of the display device DD, is indicated as a third directional axis DR3. A front surface (or a top surface) and a rear surface (or a bottom surface) in each of the members are distinguished by the third directional axis DR3. However, directions indicated as the first to third directional axes DR1, DR2, and DR3 may relative and thus be changed to other directions. Hereinafter, first to third directions refer to the same reference symbols as the directions indicated by the first to third directional axes DR1, DR2, and DR3, respectively.

The display device DD of some exemplary embodiments may include at least one folding area FA. Referring to FIGS. 1 and 2, the display device DD may include a folding area FA and a plurality of non-folding areas NFA. The folding area FA may be disposed between the non-folding areas NFA, and the folding area FA and the non-folding areas NFA may be arranged adjacent to each other in the direction of the first directional axis DR1.

The folding area FA may be a portion deformable in a folded form with respect to a folding axis FX extending in the direction of the second directional axis DR2. The folding area FA may have a radius of curvature RD of about 5 mm or less.

One folding area FA and two non-folding areas NFA are illustrated in FIGS. 1 and 2 for this exemplary embodiment, but the number of folding area and non-folding areas is not limited thereto. For example, the display device DD may include more than a plurality of non-folding areas and a plurality of folding areas disposed between non-folding areas.

In the display device DD of some exemplary embodiments, the non-folding areas NFA may be arranged to be generally symmetrical with respect to the folding area FA. However, the exemplary embodiments are not limited thereto, and the folding area FA may be disposed between the non-folding areas NFA, and the areas of the two non-folding areas NFA that face each other with respect to the folding area FA may be different from each other.

The display surface DS of the display area DA may include a display area DA and a non-display area NDA around the display area DA. The display area DA may display an image IM and the non-display area NDA may not display an image IM. The non-display area NDA may surround the display area DA and define the edge of the display device DD.

Referring to FIG. 2, the display device DD may be a foldable display device DD which is folded or unfolded. For example, the folding area FA is bent along the folding axis FX in a direction generally parallel to the second directional axis DR2, and the display device DD may be folded. The folding axis FX may be defined as a short axis generally parallel to the sort sides of the display device DD.

When the display device DD is folded, the non-folding areas NFA face each other, and the display device DD may be in-folded so that the display surface DS is not exposed to the outside. However, the exemplary embodiments are not limited thereto, and unlike the depiction, the display device DD may be out-folded so that the display surface DS is exposed to the outside.

Figure 3:
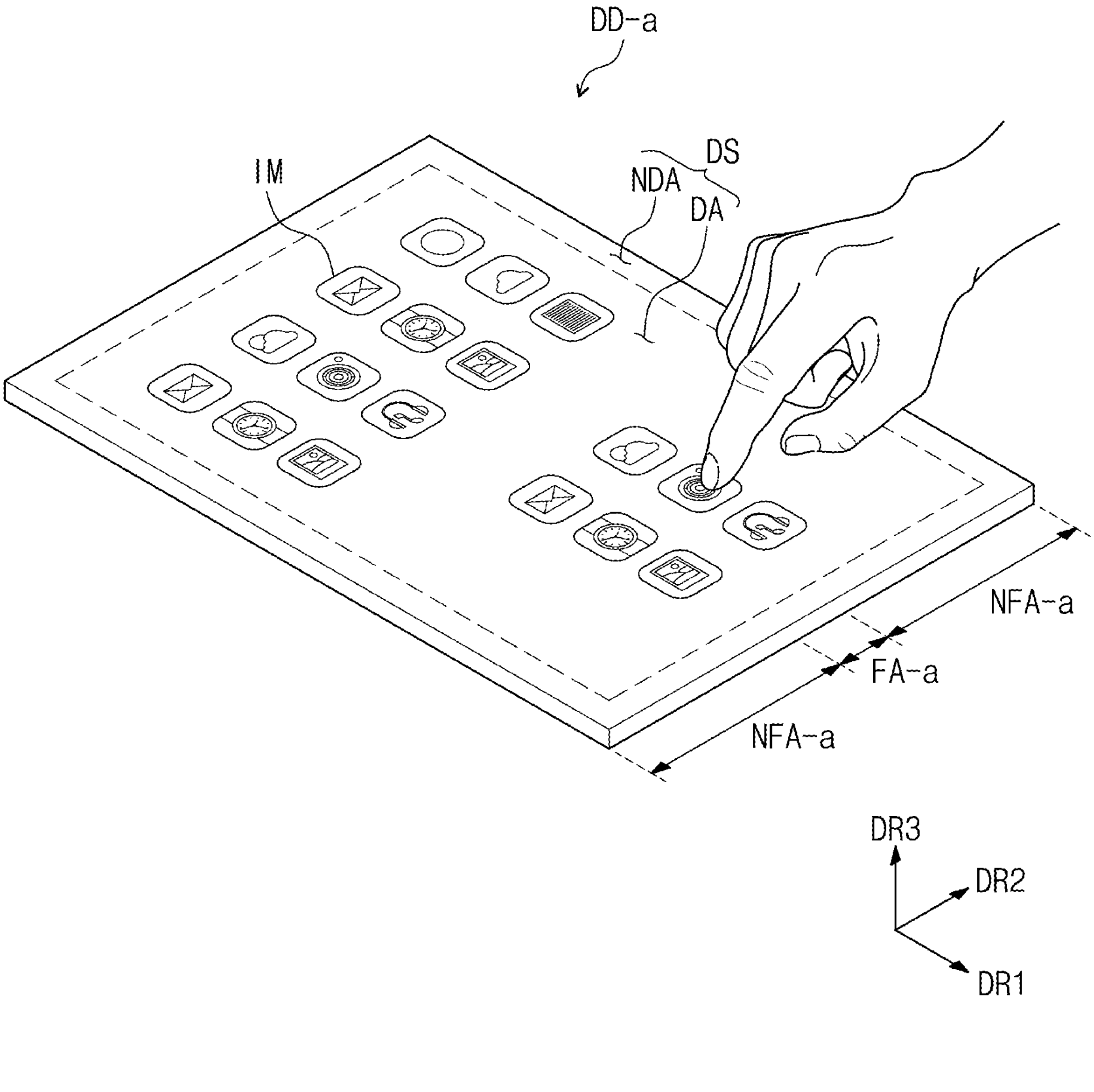
FIG. 3 is a perspective view illustrating another exemplary embodiment of a display device constructed according to principles of the invention.
Figure 4:
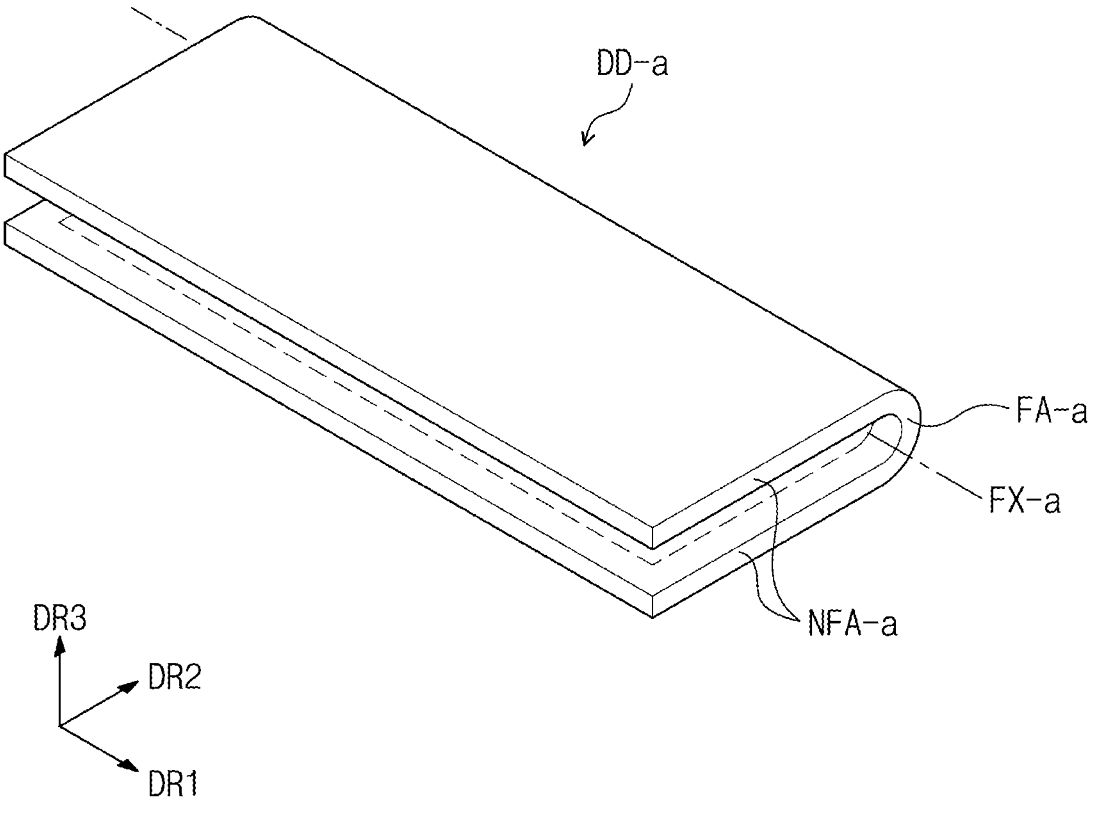
FIG. 4 is a perspective view illustrating the display device shown in FIG. 3 in a folded position.

FIG. 3 is a perspective view illustrating another exemplary embodiment of a display device constructed according to principles of the invention. FIG. 4 is a perspective view illustrating the display device shown in FIG. 3 in a folded position.

Except for the folded position, the display device DD-a shown in FIG. 3 may have substantially the same configuration as the display device DD shown in FIG. 1. Therefore, the following description of the display device DD-a shown in FIGS. 3 and 4 will focus on the folding operation to avoid redundancy.

Referring to FIGS. 3 and 4, the display device DD-a may include a folding area FA-a and a plurality of non-folding areas NFA-a. The folding area FA-a may be disposed between the non-folding areas NFA-a, and the folding area FA-a and the non-folding areas NFA-a may be arranged adjacent to each other in the direction of the second directional axis DR2.

For example, the folding area FA-a is bent along the folding axis FX-a generally parallel to the first directional axis DR1, and the display device DD-a may be folded. The folding axis FX-a may be defined as a long axis generally parallel to the long sides of the display device DD-a. The display device DD shown in FIG. 1 may be folded along the short axis, whereas the display device DD-a shown in FIG. 3 may be folded along the long axis. FIG. 4 illustrates the display device DD-a in-folded so that the display surface DS is not exposed to the outside, but the exemplary embodiments are not limited thereto, and the display device DD-a may be folded along the long axis and out-folded.

Figure 5:
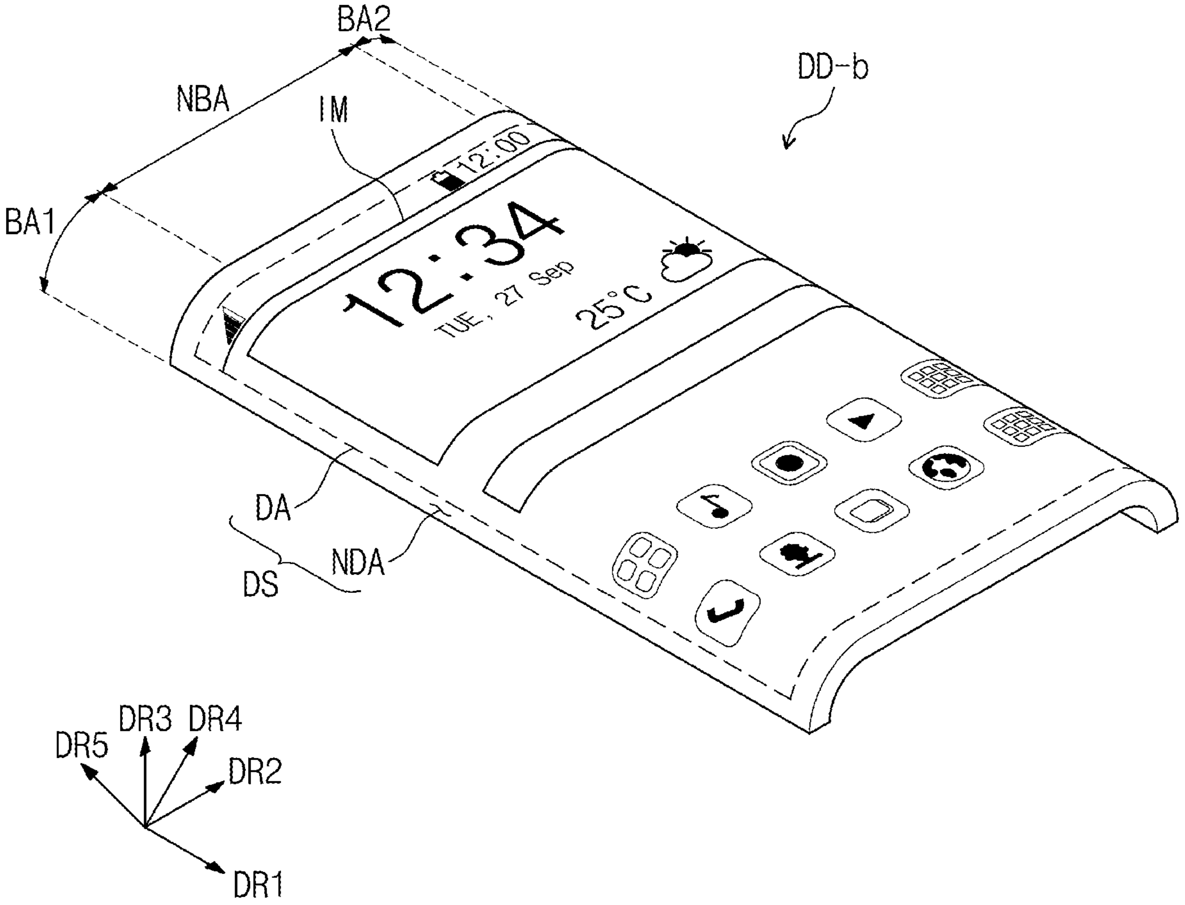
FIG. 5 is a perspective view illustrating yet another exemplary embodiment of a display device constructed according to principles of the invention.

FIG. 5 is a perspective view illustrating yet another exemplary embodiment of a display device constructed according to principles of the invention.

Referring to FIG. 5, the display device DD-b of an exemplary embodiment includes bending areas BA1 and BA2 and a non-bending area NBA, and the bending areas BA1 and BA2 may be bent from one side of the non-bending area NBA. The display device DD-b may include the non-bending area NBA in which an image IM is displayed in a front view, a first bending area BA1 and a second bending area BA2 in which an image IM is displayed in a side view. The first bending area BA1 and the second bending area BA2 may be bent from the both sides of the non-bending area NBA.

Referring to FIG. 5, the non-bending area NBA provides the image IM in the direction of the third directional axis DR3, which is the front surface of the display device DD-b, the first bending area BA1 may provide an image IM in the direction of a fifth directional axis DR5, and the second bending area BA2 may provide an image in the direction of a fourth directional axis DR4. The fourth directional axis DR4 and the fifth directional axis DR5 may be directions intersecting the first to third directional axes DR1, DR2, and DR3. However, the directions indicated by the first to fifth direction axes DR1 to DR5 are relative concepts and are not limited to the direction relationships shown in the drawings.

The display device DD-b may be a bendable display device including the non-bending area NBA and the bending areas BA1 and BA2 which are disposed on the both sides of the non-bending area NBA, respectively. In addition, the display device of another exemplary embodiment may be a bendable display device including one non-bending area and one bending area. In this case, the bending area may be bent from only one side of the non-bending area.

In FIGS. 1 to 5 as described above, the foldable display device, the bending display device, and the like are illustrated and described, but the exemplary embodiments are not limited thereto. The display device of some exemplary embodiments may be a rollable display device, a flat rigid display device, or a curved rigid display device.

As discussed below, the display device DD which is folded along the short axis will be described as an exemplary embodiment, but the exemplary embodiments are not limited thereto. The following description may be applied to various types of display devices as well as the display device DD-a which is folded along the long axis and the display device DD-b including the bending area.

Figure 6:
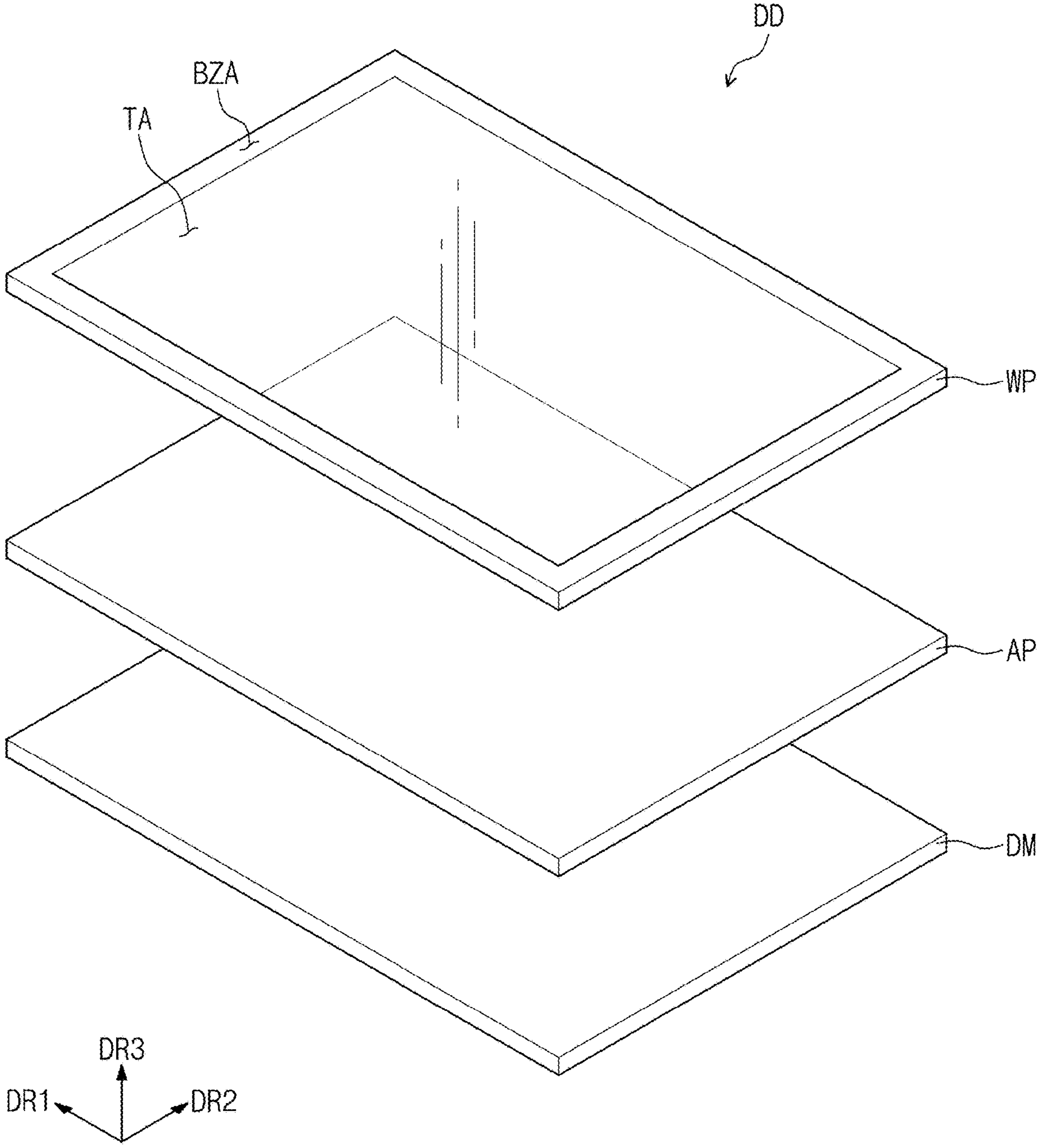
FIG. 6 is an exploded, perspective view of still another exemplary embodiment of a display device constructed according to principles of the invention.
Figure 7:
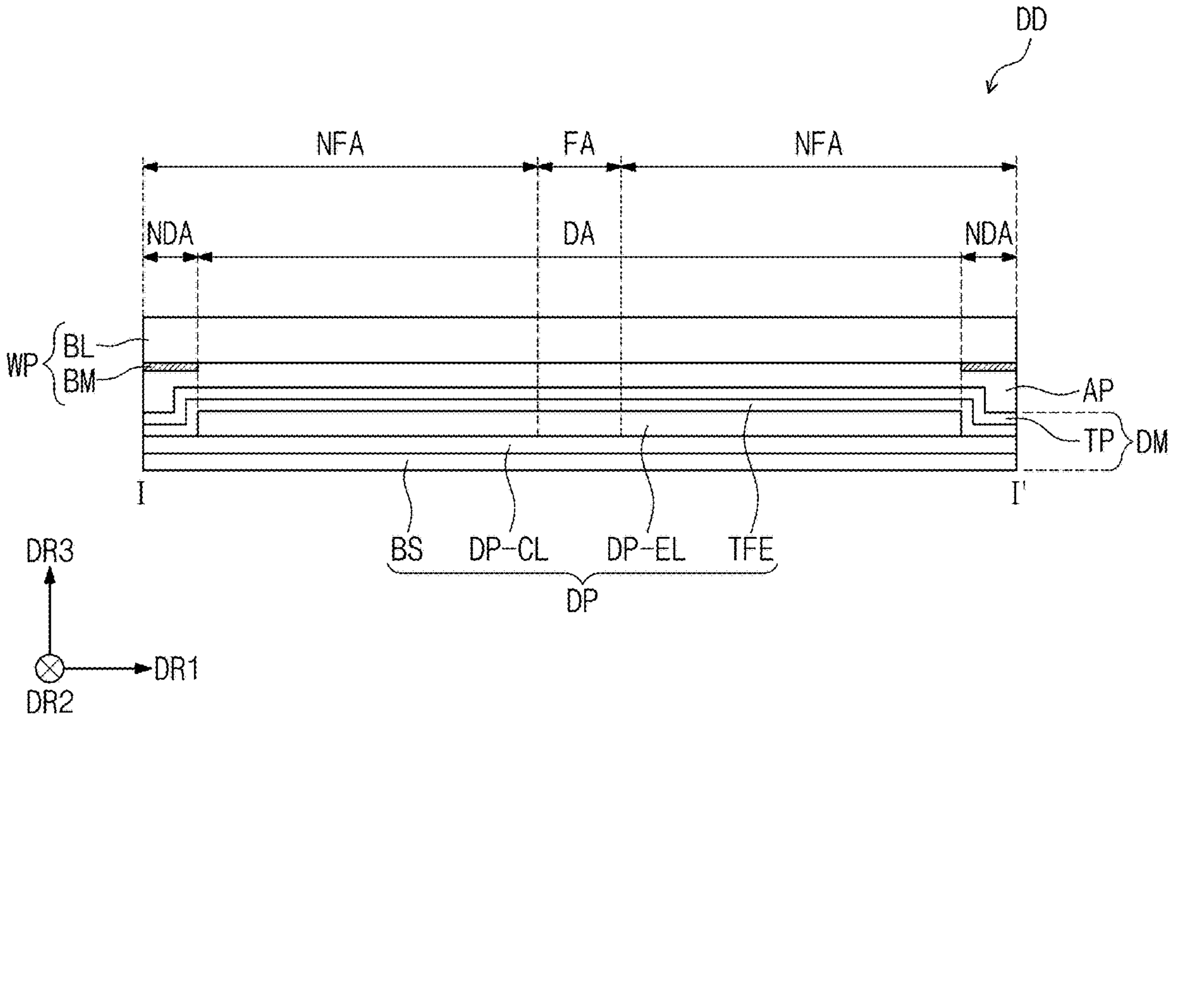
FIG. 7 is a cross-sectional view of the display device taken along line I-I' shown in FIG. 1.

FIG. 6 is an exploded, perspective view of still another exemplary embodiment of a display device constructed according to principles of the invention. FIG. 7 is a cross-sectional view of the display device taken along line I-I' shown in FIG. 1.

Some of the indicia, such as "NDA", are the same as referenced in previous figures.

The display device DD may include a display module DM and a window WP disposed on the display module DM. In the display device DD, the display module DM may include a display panel DP including a display element layer DP-EL, and an input sensor in the form of an input sensing unit TP disposed on the display panel DP. The display device DD of some exemplary embodiments may include an adhesive in the form of an adhesive member AP disposed between the display panel DP and the window WP. For example, in the display device DD of some exemplary embodiments, the adhesive member AP may be disposed between the input sensing unit TP and the window WP. The adhesive member AP may be an optically clear adhesive (OCA) film or an optically clear adhesive resin (OCR) layer.

The adhesive member AP may be formed from a resin composition of some exemplary embodiments. The resin composition of some exemplary embodiments may include a (meth)acrylic monomer containing at least one (meth) acryloyl group, a urethane acrylate oligomer having a weight average molecular weight (Mw) of about 27,000 to about 50,000, and at least one photoinitiator. As used herein, the (meth)acryloyl group may represent an acryloyl group or a methacryloyl group, and a (meth)acrylic compound, such as a monomer, may represent an acrylic or a methacrylic compound, such as a monomer.

In the resin composition of some exemplary embodiments, the (meth)acrylic monomer may contain at least one acryloyl group or at least one methacryloyl group per monomer unit. For example, the (meth)acrylic monomer may be a acrylate monomer or a methacrylate monomer containing one acryloyl group or one methacryloyl group.

In the resin composition of some exemplary embodiments, the (meth)acrylic monomer may contain a plurality of different monomers. For example, in the resin composition of some exemplary embodiments, the (meth)acrylic monomer may contain at least one acrylate monomer and at least one methacrylate monomer.

In the resin composition of some exemplary embodiments, the (meth)acrylic monomer may contain at least one of an alicyclic (meth)acrylate, a (meth)acrylate containing a hydroxy group, an alkyl (meth)acrylate, or an aromatic (meth)acrylate.

In the resin composition of some exemplary embodiments, the (meth)acrylic monomer may include at least one of 2-ethylhexyl acrylate, (2-methyl-2-ethyl-1,3-dioxolan-4-yl)methyl acrylate, 4-hydroxybutyl acrylate, 4-acryloyl morpholine, isobornyl acrylate, n-butyl acrylate, butyl-methacrylate, methyl (meth)acrylate, 2-hydroxyethyl acrylate, or octyl (meth)acrylate.

Specifically, in the resin composition of some exemplary embodiments, the (meth)acrylic monomer may include at least one of 2-ethylhexyl acrylate, (2-methyl-2-ethyl-1,3-dioxolan-4-yl)methyl acrylate, 4-hydroxybutyl acrylate, and 4-acryloyl morpholine. However, the exemplary embodiments are not limited thereto, and a (meth)acrylic monomer containing at least one of an acryloyl group or a methacryloyl group may be used. For example, examples of alkyl (meth)acrylate may include n-butyl (meth)acrylate, i-butyl (meth)acrylate, t-butyl (meth)acrylate, isooctyl (meth)acrylate, isodecyl (meth)acrylate, lauryl (meth)acrylate, stearyl (meth)acrylate, isostearyl (meth)acrylate, etc. Examples of alicyclic (meth)acrylate may include dicyclopentenyl oxyethyl (meth)acrylate, norbornene (meth)acrylate, dicyclopentanyl (meth)acrylate, isobornyl (meth)acrylate, etc. Examples of cyclic ether (meth)acrylate may include tetrahydrofurfuryl (meth)acrylate, (5-ethyl-1,3-dioxan-5-yl) methyl (meth)acrylate, etc. Examples of 2-hydroxyethyl (meth)acrylate may include 2-hydroxyethyl (meth)acrylate, 2-hydroxypropyl (meth)acrylate, 2-hydroxybutyl (meth) acrylate, etc. Examples of (meth)acrylate having a nitrogen-containing heterocycle may include N-(meth)acryloyl morpholine, N-vinyl-2-pyrrolidone, N-(meth) acryloylpyrrolidone, N-(meth)acryloyl piperidine, N-(meth) acryloyl pyrrolidine, N-(meth)acryloyl aziridine, aziridinylethyl (meth)acrylate, 2-vinylpyridine, 4-vinylpyridine, 2-vinylpyrazine, 1-vinylimidazole, N-vinylcarbazole, N-vinylphthalimide, etc.

The resin composition of some exemplary embodiments includes a urethane acrylate oligomer. In some exemplary embodiments, the urethane acrylate oligomer corresponds to an oligomer having a weight average molecular weight of about 27,000 to about 50,000.

In some exemplary embodiments, the urethane acrylate oligomer may include a photocurable compound containing at least one (meth)acryloyl group having a urethane bond. The urethane acrylate oligomer may include at least one of an acrylate having a urethane bond, a urethane acrylate having a polycarbonate skeleton, or a urethane acrylate having a polyether skeleton. For example, the resin composition of some exemplary embodiments may include at least one urethane acrylate oligomer sold under the trade designation UN-5500 and UN-6305 by Negami Chemical Industrial Co., Ltd of Nomi-City, Japan, UF-C051 by KYOEISHA CHEMICAL Co., Ltd of Osaka, Japan, and KRM8792 by DAICEL-ALLNEX of Tokyo, Japan.

The resin composition including the urethane acrylate oligomer having a weight average molecular weight of about 27,000 to about 50,000 may exhibit low viscosity characteristics which allows to be coated by means of a method, such as an inkjet printing method or a dispensing coating method. In addition, the urethane acrylate oligomer having a weight average molecular weight of about 27,000 to about 50,000 may be contained in the resin composition in an oligomeric state having a relatively high degree of polymerization and maintain a high degree of polymerization even after photo-curing, thereby exhibiting low storage elastic modulus (G') value and high peeling strength characteristics.

The resin composition of some exemplary embodiments may have a viscosity of about 10 millipascal seconds (mPa·s) to about 50 mPa·s at 25° C. The viscosity of the resin composition was measured by JIS K7117-2 method.

When the viscosity of the resin composition of some exemplary embodiments is less than about 1.0 mPa·s, a low viscosity causes a flow of the resin composition solution provided to form an adhesive member, and thus, it may be difficult to form a coating film having a uniform thickness using the resin composition. In addition, when the viscosity of the resin composition of some exemplary embodiments is greater than about 50 mPa·s, it may be difficult to discharge the resin composition in an appropriate amount from the coating device used to apply the resin composition.

The resin composition of some exemplary embodiments may include about 10 wt % to about 30 wt % of the urethane acrylate oligomer based on a total content of 100 wt % of the (meth)acrylomonomer and the urethane acrylate oligomer. The resin composition of some exemplary embodiments includes about 10 wt % to about 30 wt % of the urethane acrylate oligomer having a weight average molecular weight of about 27,000 to about 50,000 and exhibits a low viscosity characteristic of about 1.0 mPa·s to about 50 mPa·s in a resin state, and may exhibit low modulus of elasticity and high adhesive strength characteristics after photo-curing.

The resin composition of some exemplary embodiments may include at least one photoinitiator. When a plurality of photoinitiators is included, different photoinitiators may be activated by ultraviolet (UV) rays having different center wavelengths.

The photoinitiator may be any one selected from among 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methyl-propan-1-one).

In addition, the photoinitiator may be any one selected from among 2-methyl-1-[4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, and bis(2,4-cyclopentadienyl)bis[2,6-difluoro-3-(1-pyrryl)phenyl] titanium (IV).

A liquid resin composition is cured by UV irradiation, and after UV curing, may have a storage elastic modulus value of about $1.0\times10^3$ Pascal (Pa) to about $1.0\times10^6$ Pa at 25° C. In addition, the liquid resin composition is cured by UV irradiation to be formed in a film or thin film type, and after UV curing, may have a 180° peeling strength value of at least about 15 Newton (N)/inch with respect to the surface of a glass substrate.

The display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL.

The configuration of the display panel DP illustrated in FIG. 7 is exemplary, and the exemplary embodiments of the display panel DP are not limited to the configuration illustrated in FIG. 7. For example, the display panel DP may include a liquid crystal display element, and in this case, the encapsulation layer TFE may be omitted.

The input sensing unit TP may be disposed on the display panel DP. For example, the input sensing unit TP may be disposed directly on the encapsulation layer TFE of the display panel DP. The input sensing unit TP may detect an external input, convert the external input to a predetermined signal, and provide the input signal for the display panel DP. For example, in the display device DD of some exemplary embodiments, the input sensing unit TP may be a touch detective part configured to detect a touch. The input sensing unit TP may perceive a direct touch by a user, an indirect touch by a user, a direct touch by an object, or an indirect touch by an object. The input sensing unit TP may detect at least one among the position and force (pressure) of the externally applied touch. The input sensing unit TP of some exemplary embodiments may have various configurations or be configured using various materials, and is not limited to any one exemplary embodiment. The input sensing unit TP may include a plurality of sensing electrodes so as to detect an external input. The sensing electrodes may detect an external input through a capacitance method. The display panel DP may receive the input signal from the input sensing unit TP, and generate an image corresponding to the input signal.

The window WP may protect the display panel DP, the input sensing unit TP, and the like. The image generated in the display panel DP may be provided to a user through the window WP. The window WP may provide a touch surface of the display device DD. In the display device DD including the folding area FA, the window WP may be a flexible window.

The window WP may include a base layer BL and a printing layer BM. The window WP may include a transmission area TA and a bezel area BZA. The front surface of the window WP including the transmission area TA and the bezel area BZA corresponds to the front surface of the display device DD.

The transmission area TA may be an optically transparent area. The bezel area BZA may have a relatively lower light transmittance than the transmission area TA. The bezel area BZA may have a predetermined color. The bezel area BZA may be adjacent to the transmission area TA, and may surround the transmission area TA. The bezel area BZA may define the shape of the transmission area TA. However, the exemplary embodiments are not limited to the illustrated example, and the bezel area BZA may be disposed adjacent to only one side of the transmission area TA, and a part of the bezel area BZA may be omitted.

The base layer BL may be a glass or plastic substrate. For example, a tempered glass substrate may be used in the base layer BL. Alternatively, the base layer BL may be formed of a flexible polymer resin. For example, the base layer BL may be formed of a polyimide, a polyacrylate, a polymethylmethacrylate, a polycarbonate, a polyethylenenaphthalate, a polyvinylidene chloride, a polyvinylidene difluoride, a polystyrene, an ethylene-vinyl alcohol copolymer, or a combination thereof. However, the exemplary embodiments are not limited thereto, and a general type known in the art as a base layer BL of a window WP may be used without any limitation.

The printing layer BM may be disposed on one surface of the base layer BL. In some exemplary embodiments, the printing layer BM may be provided on the bottom surface of the base layer BL adjacent to the display module DM. The printing layer BM may be disposed on an edge area of the base layer BL. The printing layer BM may be an ink printing layer. In addition, the printing layer BM may be a layer including a pigment or a dye. In the window WP, the bezel area BZA may be a portion on which the printing layer BM is provided.

The window WP may further include at least one functional layer provided on the base layer BL. For example, the functional layer may be a hard coating layer, an anti-fingerprint coating layer, or the like, but the exemplary embodiments are not limited thereto.

There may be a stepped portion between the portion on which the printing layer BM is provided and the base layer BL on which the printing layer BM is not provided. The adhesive member AP of some exemplary embodiments, which is formed from the resin composition of some exemplary embodiments as described above, has a low storage elastic modulus and a high adhesive strength value, and thus may be adhered to the window WP at the stepped portion without forming a gap.

The adhesive member AP according to some exemplary embodiments may include a polymer derived from the resin composition of an exemplary embodiment as described above. That is, the adhesive member of some exemplary embodiments may include a polymer derived from the resin composition including: a (meth)acrylic monomer containing at least one (meth)acryloyl group; a urethane acrylate oligomer having a weight average molecular weight of about 27,000 to about 50,000; and at least one photoinitiator. The (meth)acrylic monomer, the urethane acrylate oligomer, and at least one photoinitiator may be the same as those described in the resin composition of some exemplary embodiments.

The resin composition before the polymerization by the photoinitiator may have a viscosity of about 10 mPa·s to about 50 mPa·s at 25° C. as measured by JIS K7117-2 method. In addition, the storage elastic modulus of the adhesive member AP of some exemplary embodiments may be about $1.0\times10^3$ Pa to about $1.0\times10^6$ Pa at 25° C. and the 180° peeling strength with respect to a glass substrate may be about 15 N/inch or more.

The adhesive member AP included in the display device DD of some exemplary embodiments is provided on one surface of the window WP or one surface of the display module DM in a liquid resin composition state, and the adhesive member AP may be formed by UV curing the liquid resin composition provided between the window WP and the display module DM. In some exemplary embodiments using another process, the adhesive member may be provided in a method in which the adhesive member AP is formed by UV curing the liquid resin composition, one surface of the adhesive member AP in a cured state in the form of an adhesive film is laminated on one surface of the window WP or the display module, and one unattached surface of the window WP or the display module DM is attached on the other surface of the adhesive member AP.

The adhesive member AP may have a thickness of about 50 μm to about 200 μm. For example, the adhesive member AP may have a thickness of about 100 μm to about 150 μm.

Figure 8A:
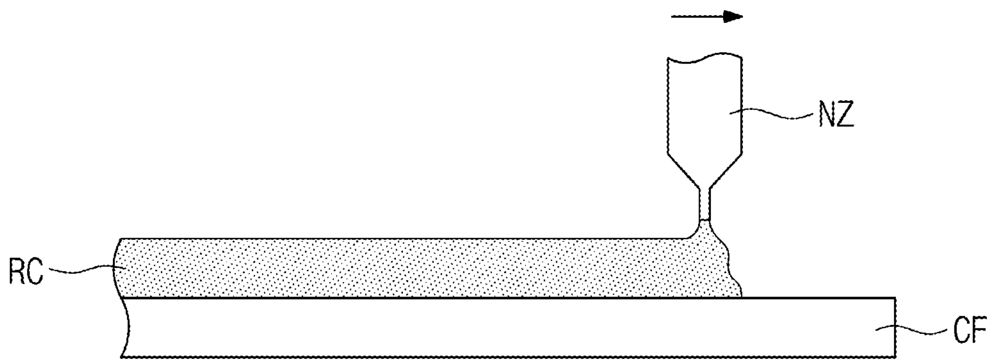
FIGS. 8A to 8C are elevational views illustrating an exemplary embodiment of a method for producing an adhesive member according to principles of the invention.
Figure 8B:
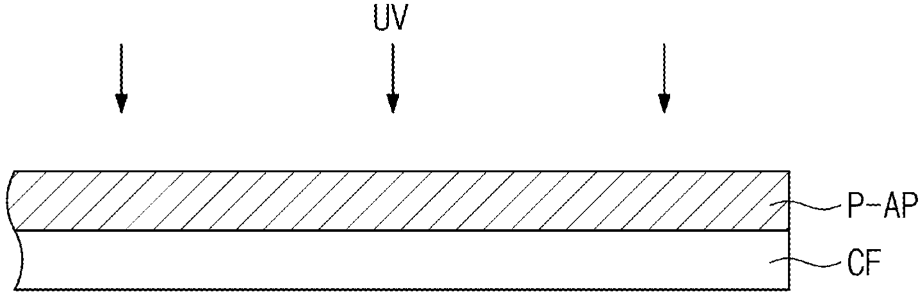
Figure 8C:
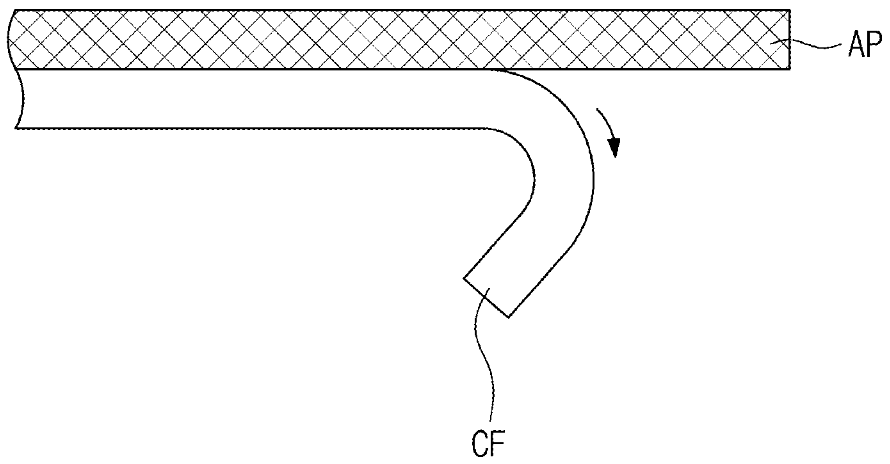

FIGS. 8A to 8C are elevational views illustrating an exemplary embodiment of a method for producing an adhesive member according to principles of the invention. Particularly, FIG. 8A shows a step for providing a resin composition RC for the formation of an adhesive member AP, FIG. 8B shows a step for irradiating the UV light, and FIG. 8C shows a step for removing a carrier film CF.

Referring to FIGS. 8A to 8C, the resin composition RC of an exemplary embodiment may be provided on the carrier film CF. For example, a polyethylene terephthalate (PET) film, etc. may be used as the carrier film CF, but the exemplary embodiments are not limited thereto. The carrier film CF serves as a substrate for coating the liquid resin composition RC, and may be used without limitation as long as the carrier film CF is capable of being easily detached from the adhesive member AP after UV curing. For example, release treatment may be conducted on one surface of the carrier film CF on which the resin composition RC is provided.

The resin composition RC may be provided by a method, such as an inkjet printing method or a dispensing method. The resin composition RC of some exemplary embodiments may have a viscosity of about 1.0 mPa·s to about 50 mPa·s at about 25° C. to be easily discharged from a nozzle NZ, and may be provided to maintain a constant coating thickness.

A preliminary adhesive member P-AP which is provided by coating the resin composition RC in a constant thickness may be irradiated by UV light. FIG. 8B shows that the ultraviolet light UV is directly irradiated on the coated preliminary adhesive member P-AP, but the exemplary embodiments are not limited thereto. A supporting carrier film may be further disposed on the preliminary adhesive member P-AP, the supporting carrier film may allow the UV light to pass therethrough to cover the preliminary adhesive member P-AP during the UV curing process.

After UV curing, the adhesive member AP may be formed. The adhesive member AP provided by removing the carrier film CF used in the process may have a storage elastic modulus of about $1.0\times10^3$ Pa to about $1.0\times10^6$ Pa at 25° C. and a 180° peeling strength of about 15 N/inch or more.

The adhesive member AP prepared by the steps of FIGS. 8A to FIG. 8C may be applied to the display device DD as described above. For example, one surface of the adhesive member AP may be attached on the display module DM, and then the window WP may be sequentially attached on the other surface of the adhesive member AP facing one surface of the adhesive member AP attached to the display module DM. Alternatively, one surface of the adhesive member AP may be attached on one surface of the window WP to face the display module DM, and then the other surface of the adhesive member AP facing one surface of the adhesive member AP attached to the window WP may be attached to the display module DM so that the adhesive member AP may be provided to the display device DD.

The resin composition in a liquid state provided between the display module DM and the window WP may be cured to form an adhesive member AP.

Figure 9A:
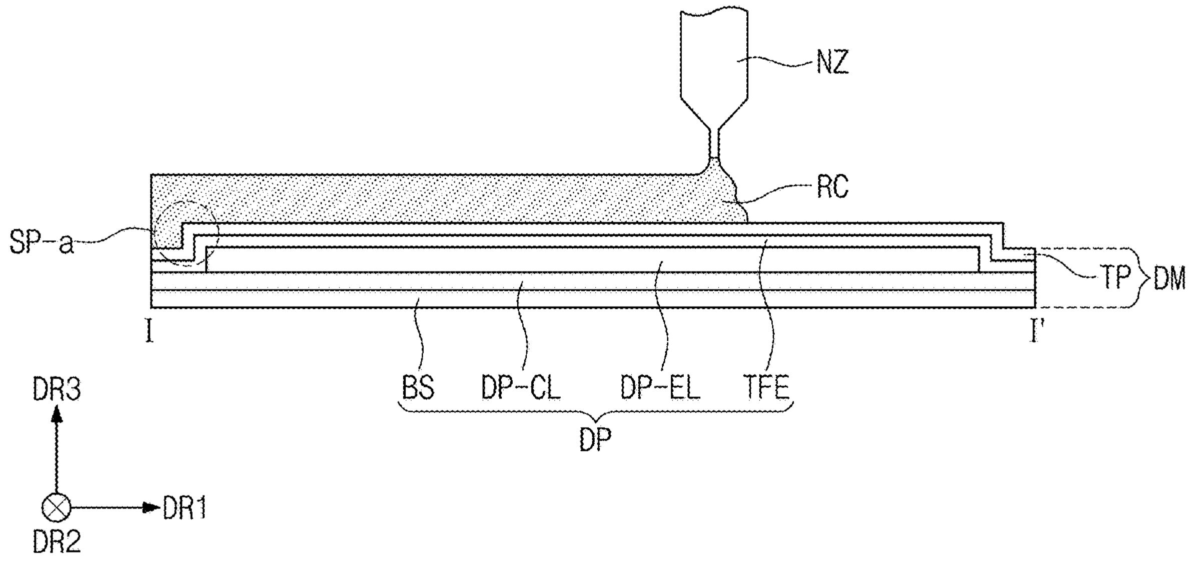
FIGS. 9A and 9B are elevational views illustrating another exemplary embodiment of a method for producing an adhesive member according to principles of the invention.
Figure 9B:
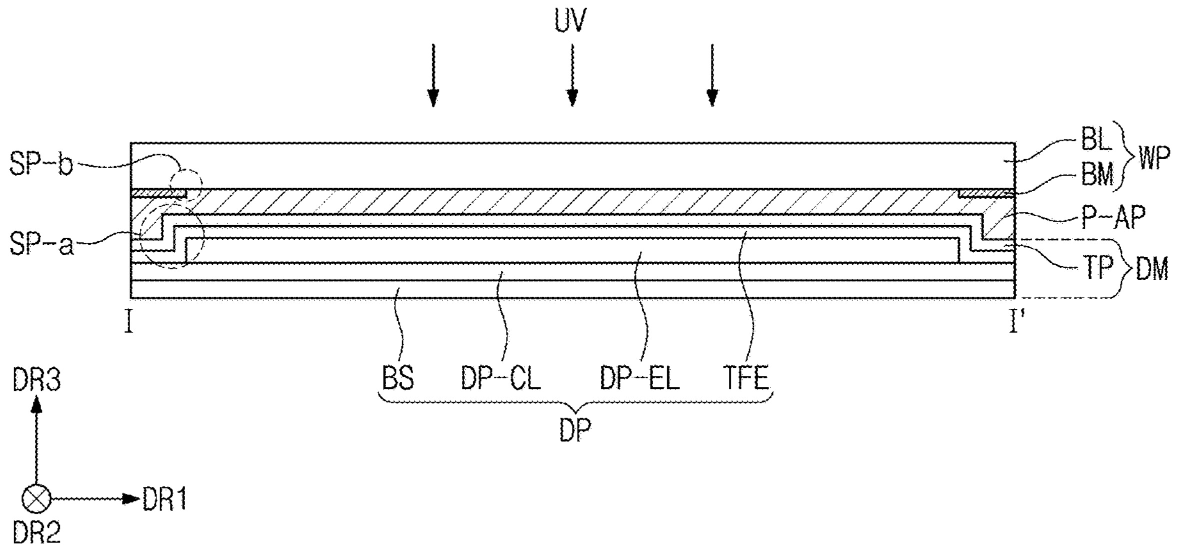

FIGS. 9A and 9B are elevational views illustrating another exemplary embodiment of a method for producing an adhesive member according to principles of the invention. Particularly, FIGS. 9A and 9B show the production steps of the adhesive member AP included in the display device DD, which is produced by a method different from the production method of the adhesive member AP described with reference to FIGS. 8A to 8C.

FIG. 9A shows a step for providing the resin composition RC on the display module DM. In addition, FIG. 9B shows a step for irradiating the ultraviolet light UV to the preliminary adhesive member P-AP formed from the resin composition RC. Some of the indicia, such as "DP", are the same as referenced in previous figures.

The resin composition RC may be provided by a method such as an inkjet printing method or a dispensing method. The resin composition RC of some exemplary embodiments may be easily discharged from the nozzle NZ by having a viscosity of about 1.0 mPa·s to about 50 mPa·s at 25° C., and may be provided to maintain a thin and constant coating thickness. In addition, the resin composition may be provided while covering the bending of the stepped portion SP-a of the display module DM by having a viscosity of about 1.0 mPa·s to about 50 mPa·s. That is, by having a low viscosity value of about 50 mPa·s or less, the resin composition RC may be filled without an empty space in the bent portion such as the stepped portion SP-a. In addition, the resin composition RC provided through the nozzle NZ may have a viscosity of about 1.0 mPa·s or more, so that the resin composition RC may be uniformly coated to a predetermined thickness without flowing out of the display module DM.

The window WP may be provided on the preliminary adhesive member P-AP provided by coating the resin composition RC to a predetermined thickness. Ultraviolet light UV for curing the resin composition RC may be provided through the window WP. When the window WP is provided on the preliminary adhesive member P-AP, the stepped portion SP-b may be filled with the resin composition RC without an empty space. That is, since the resin composition RC has a low viscosity of about 50 mPa·s or less, the preliminary adhesive member P-AP may be provided while covering the bent shapes in the bent portion such as the stepped portion SP-a between the base layer BL and the printing layer BM without any gaps. The preliminary adhesive member P-AP may be polymerized and cured by the provided ultraviolet light UV to form an adhesive member AP. The final adhesive member AP (FIG. 7) provided in the display device DD (FIG. 7) may have a storage elastic modulus of about $1.0\times10^3$ Pa to about $1.0\times10^6$ Pa at about 25° C. and a 180° peeling strength of about 15 N/inch or more with respect to a glass substrate.

Unlike the feature illustrated in FIG. 9B, before the window WP is provided on the preliminary adhesive member P-AP, the ultraviolet light UV may be provided on the preliminary adhesive member P-AP to perform the polymerization in the resin composition RC. The amount of the irradiated ultraviolet light UV may be an amount of light required to fully cure the resin composition RC. However, unlike this, the polymerization of the resin composition RC may be partially performed in the preliminary adhesive member P-AP state, the window WP may be then covered, and the unreacted resin composition RC may be further reacted to form a final adhesive member AP.

The display devices DD, DD-a, and DD-b according to exemplary embodiments illustrated in FIGS. 1 to 5 may include the adhesive member AP containing a polymer derived from the resin composition of an exemplary embodiment as described above to maintain adhesion between the window WP and the display module DM by using the adhesive member AP without detachment or gaps being formed in a folded position or a bending region.

Figure 10:
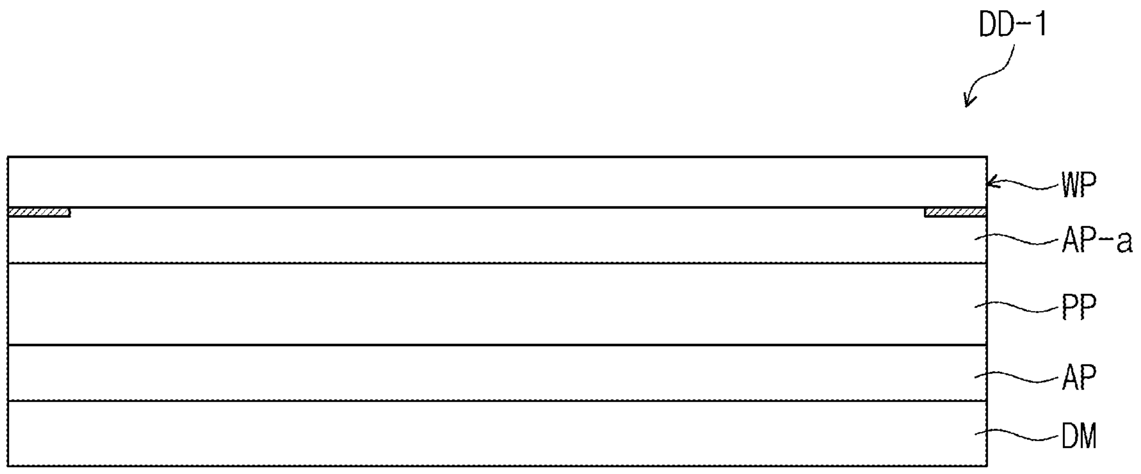
FIG. 10 is a cross-sectional view illustrating a further exemplary embodiment of a display device constructed according to principles of the invention.

FIG. 10 is a cross-sectional view illustrating a further exemplary embodiment of a display device constructed according to principles of the invention. In describing the display device of an exemplary embodiment shown in FIG. 10, the features which have been described with reference to FIGS. 1 to 9B are not described again, but their differences will be mainly described to avoid redundancy.

The display device DD-1 shown in FIG. 10 may further include a light control layer PP and an optical adhesive layer AP-a compared to the display device DD described with reference to FIGS. 6 and 7. The display device DD-1 may further include the light control layer PP disposed between the adhesive member AP and the window WP, and the optical adhesive layer AP-a disposed between the light control layer PP and the window WP.

The light control layer PP may be disposed on the display panel DP to control the light reflected by an external light in the display panel DP. The light control layer PP may include, for example, a polarization layer or a color filter layer.

The optical adhesive layer AP-a may be an optically clear adhesive (OCA) film or an optically clear adhesive resin (OCR) layer. The optical adhesive layer AP-a may be formed of the same resin composition as the adhesive member AP (FIG. 7) described above. That is, the optical adhesive layer AP-a may include a polymer derived from the resin composition including: a (meth)acrylic monomer containing at least one (meth)acryloyl group; a urethane acrylate oligomer having a weight average molecular weight of about 27,000 to about 50,000; and at least one photoinitiator.

The resin composition before the reaction by the photoinitiator may have a viscosity of about 10 mPa·s to about 50 mPa·s at about 25° C. as measured by JIS K7117-2 method. In addition, the storage elastic modulus of the optical adhesive layer AP-a of an exemplary embodiment may be about $1.0\times10^{3}$ Pa to about $1.0\times10^{6}$ Pa at about 25° C. and the 180° peeling strength with respect to a glass substrate may be about 15 N/inch or more.

The display device DD-1 of an exemplary embodiment includes the optical adhesive layer AP-a and the adhesive member AP formed of the resin composition of some exemplary embodiments. The optical adhesive layer AP-a and the adhesive member AP have a low storage elastic modulus and a high peeling strength, and thus while the display device DD-1 is folded or bent, bending at the interface of the optical adhesive layer AP-a and the adhesive member AP does not occur, which results in excellent reliability.

Figure 11:
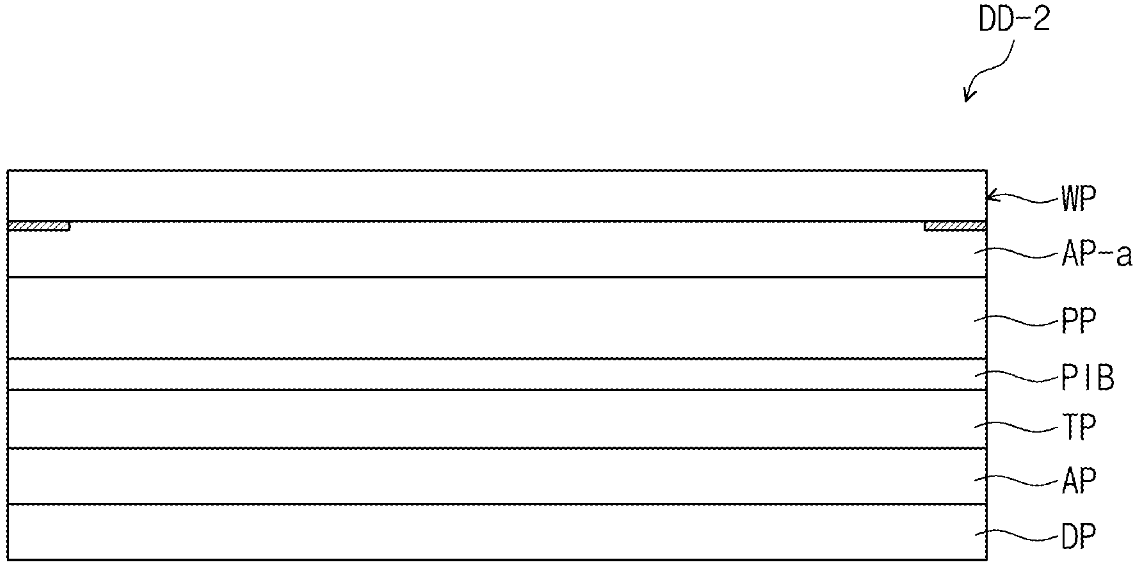
FIG. 11 is a cross-sectional view illustrating a still further exemplary embodiment of a display device constructed according to principles of the invention.

FIG. 11 is a cross-sectional view illustrating a still further exemplary embodiment of a display device constructed according to principles of the invention.

In describing the display device shown in FIG. 11, the features which have been described with reference to FIGS. 1 to 10 are not described again, but their differences will be mainly described to avoid redundancy.

The display device DD-2 shown in FIG. 11 may further include a light control layer PP, an optical adhesive layer AP-a, and an interlayer adhesive layer PIB compared to the display device DD described with reference to FIGS. 6 and 7. The display device DD-2 may further include the light control layer PP disposed between the adhesive member AP and the window WP, and the optical adhesive layer AP-a disposed between the light control layer PP and the window WP like the display device DD-1 of an exemplary embodiment shown in FIG. 10.

The display device DD-2 may provide the adhesive member AP between the display panel DP and the input sensing unit TP. That is, the input sensing unit TP may not be disposed directly on the display panel DP, and the display panel DP and the input sensing unit TP may be coupled to each other via the adhesive member AP. For example, the adhesive member AP may be disposed between the encapsulation layer TFE (FIG. 7) of the display panel DP and the input sensing unit TP.

The interlayer adhesive layer PIB may be provided to the bottom side of the light control layer PP. The interlayer adhesive layer PIB may be disposed between the input sensing unit TP and the light control layer PP, and be formed of an adhesive material having superior anti-moisture permeability. For example, the interlayer adhesive layer PIB may be formed including a polyisobutylene. The interlayer adhesive layer PIB may be disposed on the input sensing unit TP to prevent corrosion of sensing electrodes of the input sensing unit TP.

The display device DD-2 includes the optical adhesive layer AP-a and the adhesive member AP formed of the resin composition of some exemplary embodiments. The optical adhesive layer AP-a and the adhesive member AP have a low storage elastic modulus and a high peeling strength, and thus while the display device DD-2 is folded or bent, the bending at the interface of the optical adhesive layer AP-a and the adhesive member AP does not occur, which results in excellent reliability.

As discussed below, with reference to Examples and Comparative Examples, a resin composition according to some exemplary embodiments, an adhesive member made from the same, and a display device having the adhesive member will be described in detail.

EXAMPLES

Preparation of Resin Composition

Resin compositions of Examples and Comparative Examples were prepared with the compound ratio listed in Table 1. A (meth)acrylic monomer (component A) and a urethane acrylate monomer (component B) were provided to a heat-resistant light-shielding container in the weight ratio shown in Table 1, and then stirred for 30 minutes to about 1 hour at a temperature of 60-80° C. under atmospheric pressure at a speed of 200 rpm/min. Then, the stirred composition was cooled to room temperature, a photoinitiator (component C) was added to the heat-resistant light-shielding container, and the photoinitiator was uniformly mixed at 25° C. under atmospheric pressure to prepare a resin composition of Examples and Comparative Examples.

TABLE 1

| Components | | Example 1 | Example 2 | Example 3 | Example 4 | Comparative Example 1 | Comparative Example 2 | Comparative Example 3 |
|---|---|---|---|---|---|---|---|---|
| A | A-1 | 45 | 40 | 35 | 40 | 40 | 40 | 40 |
| | A-2 | 20 | 20 | 20 | 20 | 20 | 15 | 10 |
| | A-3 | 20 | 20 | 20 | 20 | 20 | 20 | 20 |
| | A-4 | 5 | 5 | 5 | 5 | 5 | 5 | 5 |
| B | B-1 | 10 | | | | | | |
| | B-2 | | 15 | | | | | |
| | B-3 | | | 20 | | | | |
| | B-4 | | | | 15 | | | |
| | B-5 | | | | | 15 | | |
| | B-6 | | | | | | 20 | |
| | B-7 | | | | | | | 25 |
| | C | 1 | 1 | 1 | 1 | 1 | 1 | 1 |

Data About Material Used as Component A

The kinds of (meth)acrylic monomers used in Examples and Comparative Examples listed in Table 1 above are as follows.

- A-1: 2EHA (2-ethylhexyl acrylate), viscosity 5.0 mPa·s, Mitsubishi Chemical Corporation, of Tokyo, Japan.
- A-2: MEDOL-10 ((2-methyl-2-ethyl-1,3-dioxolan-4-yl) methyl acrylate), viscosity 5.1 mPa·s, Osaka Organic Chemical Industry Ltd., of Osaka, Japan.
- A-3: 4HBA (4-hydroxybutyl acrylate), viscosity 10 mPa·s, Osaka Organic Chemical Industry Ltd., of Osaka, Japan.
- A-4: ACMO (4-acryloyl morpholine), viscosity 12 mPa·s, KJ Chemicals, of Tokyo, Japan.

Data About Material Used as Component B

The kinds of urethane acrylate oligomers used in Examples and Comparative Examples listed in Table 1 above are as follows.

- B-1: sold under trade designation UN-5500 (Negami Chemical Industrial Co., Ltd of Nomi-City, Japan), average molecular weight 50,000.
- B-2: sold under trade designation UF-C051 (KYOEISHA CHEMICAL Co., Ltd of Osaka, Japan), average molecular weight 35,000.
- B-3: sold under trade designation KRM8792 (DAICEL-ALLNEX of Tokyo, Japan), average molecular weight 30,000.
- B-4: sold under trade designation UN-6305 (Negami Chemical Industrial Co., Ltd of Nomi-City, Japan), average molecular weight 27,000.
- B-5: sold under trade designation KRM879 by DAICEL-ALLNEX of Tokyo, Japan, average molecular weight 25,000
- B-6: sold under trade designation UN-6202 by Negami Chemical Industrial Co., Ltd of Nomi-City, Japan, average molecular weight 11,000.
- B-7: sold under trade designation UN-6200 by Negami Chemical Industrial Co., Ltd of Nomi-City, Japan, average molecular weight 6,500.

Component C

- C: sold under the trade designation Omnirad184 (1-hydroxycyclohexyl-phenyl ketone), by IGM Resins B.V., of Waalwijk, The Netherlands 2. Evaluation of Physical Properties of Resin Composition and Adhesive Member Formed of Resin Composition The viscosity of the resin composition having the composition ratio of Table 1 above, and the storage elastic modulus and the adhesive strength value of the adhesive member formed of this resin composition are shown in Table 2 below. The viscosity of the resin composition, and the storage elastic modulus, the peeling strength, and the bending reliability of the adhesive member were measured as follows.

Viscosity Measurement Method

Members formed of this resin composition are shown in Table 2 below. The viscosity of the resin composition, and the storage elastic modulus, the peeling strength, and the bending reliability of the adhesive member were measured as follows.

Viscosity Measurement Method

The viscosity of the resin composition described herein is measured by JIS K7117-2 method at 25° C. at a speed of 10 rpm using a viscometer sold under a trade designation TVE-25L from TOKI SANGYO CO., Ltd. of Tokyo, Japan.

Storage Elastic Modulus Measurement Method

The storage elastic modulus was measured by JISK7244-7 method using a rheometer sold under the trade designation MCR 302 by AntonPaar of Graz, Austria. The storage elastic modulus was measured by a torsional shear method under the condition of a measuring frequency of 1 Hz and a measuring temperature of 25° C. In particular, the storage elastic modulus was measured after photo-curing by irradiating 1000 mJ/cm$^2$ of the ultraviolet light having a wavelength of 365 nm to the resin composition of Examples and Comparative Examples.

Peeling Strength Measurement Method

The resin composition of Example or Comparative Example was applied on a glass substrate sold under the trade designation S1227 by MATSUNAMI GLASS Ind., Ltd. of Osaka, Japan, a 100 μm-thick polyethylene terephthalate (PET) film was covered on the applied resin composition, and then the resin composition was cured by irradiating 1000 mJ/cm$^2$ of the ultraviolet light having a wavelength of 365 nm to a PET film side. The thickness of the adhesive member obtained after UV curing was adjusted to 100 μm. The specimen of the adhesive member obtained by UV curing was peeled at 180° at a speed of 60 mm/min using a universal testing machine sold under the trade designation 5960 by Instron Company of Norwood, Massachusetts a subsidiary of ITW, Inc. of Glenview, Illinois, and then a 180° peeling test was performed. The measured 180° peeling strength corresponds to the measurement of the adhesive strength to a glass substrate based on a PET film.

Bending Reliability Evaluation Method

Under the condition of 23° C. and 50% Room Humidity (RH), the resin compositions of Examples and Comparative Examples were applied to respective surfaces of a polyethylene terephthalate film (thickness: 100 μm), the resin composition additionally provided on a separate polyethylene terephthalate film (thickness: 100 μm) was covered, and then the photoreaction was performed by irradiating 1000 mJ/cm$^2$ of the ultraviolet ray to the resin composition. The thickness of the adhesive member formed by performing photoreaction was adjusted to 100 μm. Thereafter, the adhesive member prepared under the condition of 23° C. and 50% RH was left for 24 hours. The laminate composed of the PET film/adhesive member/PET film thus obtained was cut into 50 mm width and 200 mm length, and this was used as a sample.

The obtained sample was repeatedly bent under the following conditions using a durability tester (sold under the trade designation Tension-Free U-shaped extension tester by Yuasa System Equipment Co. Ltd of Okayama City, Japan). Thereafter, whether there was any gap or peeling at the interface between the adhesive member and the object (PET film) to be adhered and whether the adhesive leaked out from the adhesive member of the laminate was visually checked to evaluate the reliability. The repeated bending experiment was performed by observing the state after bending 30,000 times with the bending diameter of 3 mm at 23° C.

In the state after 30,000 repeatedly bending, the case of no deformation of the adhesive member and no gaps in the laminate was evaluated as "OK", and the case of gaps or peeling from the laminate or the flow of the adhesive member was evaluated as "NG".

TABLE 2

| Evaluation Item | Example 1 | Example 2 | Example 3 | Example 4 | Comparative Example 1 | Comparative Example 2 | Comparative Example 3 |
|---|---|---|---|---|---|---|---|
| Viscosity (mPa · s) | 50 | 49 | 47 | 45 | 41 | 43 | 39 |
| Storage elastic modulus ($\times 10^6$ Pa) | 0.8 | 0.3 | 0.5 | 1.0 | 1.2 | 3.3 | 12 |
| Peeling strength (N/inch) | 19 | 21 | 19 | 15 | 12 | 10 | 10 |
| Bending reliability | OK | OK | OK | OK | NG | NG | NG |

Referring to the results of Table 2, it was confirmed that Example 1 to Example 4 have a viscosity of 50 mPa·s or less in a state of the resin composition. The resin compositions of Example 1 to Example 4 have a low viscosity characteristic, and thereby may be used to form a thin uniform coating film.

In addition, in Example 1 to Example 4, oligomers having a molecular weight of about 27,000 to about 50,000 were used as urethane acrylate oligomers (component B), and oligomers having a higher polymerization degree than oligomers (component B) used in Comparative Example 1 to Comparative Example 3 were used. Example 1 to Example 4 included a urethane acrylate oligomer (component B) having a relatively high polymerization degree as a resin composition to exhibit low storage elastic modulus and high peeling strength characteristics even after photo-curing. That is, it is believed that Example 1 to Example 4 include a urethane acrylate oligomer having a molecular weight of about 27,000 to about 50,000 and have a higher equivalent of an acrylic group per oligomer unit compared to Comparative Example 1 to Comparative Example 3 including a urethane acrylate oligomer having a molecular weight of about 25,000 or less, thereby exhibiting a relatively low storage elastic modulus and high peeling strength compared to Comparative Examples. In addition, Example 1 to Example 4 exhibit better characteristics in the bending reliability compared to Comparative Example 1 to Comparative Example 3.

Some of the advantages that may be include The exemplary resin compositions made according to the principles and exemplary embodiments of the invention have an advantageous property in forming a thin uniform coating film with a viscosity of about 1.0-about 50 mPa·s before curing, and may exhibit an excellent coating property even on bent surfaces due to a low viscosity characteristic. In addition, the exemplary adhesive member formed of the resin composition may exhibit low modulus of elasticity and high adhesion characteristics. Furthermore, the exemplary display device may include an adhesive member having low modulus of elasticity and high adhesive characteristics, and thus has improved reliability as no peeling or gaps occur in the bent portion of the adhesive member, and the bending between the members adjacent to the adhesive member even in an operating state of bending or folding, thereby producing excellent operation reliability. The resin composition made according to the principles and exemplary embodiments of the invention may have low viscosity characteristics and exhibit excellent applicability on various types of substrates. The adhesive member made according to the principles and exemplary embodiments of the invention may be formed from a resin composition including a high degree of polymerization of a urethane acrylate oligomer, thereby exhibiting low modulus of elasticity and high adhesive strength characteristics. The exemplary display device may include an adhesive member with a low modulus of elasticity and high adhesion to exhibit excellent reliability in various operations.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A resin composition for a display device, the composition comprising:

a (meth)acrylic monomer comprising at least one (meth) acryloyl group;

a urethane acrylate oligomer having a weight average molecular weight of about 27,000 to about 50,000; and at least one photoinitiator; wherein the (meth)acrylic monomer comprises (2-methyl-2-ethyl-1,3-dioxolan-4-yl)methyl acrylate, 2-ethylhexyl acrylate, 4-hydroxybutyl acrylate, and 4-acryloyl morpholine.

2. The resin composition of claim 1, wherein the resin composition has a viscosity of about 1.0 mPa·s to about 50 mPa·s at 25° C. as measured by JIS K7117-2 method.

3. The resin composition of claim 1, wherein the urethane acrylate oligomer comprises a photocurable compound comprising at least one (meth)acryloyl group having a urethane bond.

4. The resin composition of claim 1, wherein the urethane acrylate oligomer is included by about 10 wt % to about 30 wt % based on a total content of 100 wt % of the (meth) acrylic monomer and the urethane acrylate oligomer.

5. The resin composition of claim 1, wherein the resin composition has a storage elastic modulus of about $1.0\times10^3$ Pa to about $1.0\times10^6$ Pa at 25° C. after UV curing.

6. The resin composition of claim 1, wherein the resin composition has a 180° peeling strength of about 15 N/inch or more after UV curing, and the 180° peeling strength is a peeling strength with respect to a glass substrate.

* * * * *